(12) United States Patent
Parikh

(10) Patent No.: US 7,866,609 B2
(45) Date of Patent: Jan. 11, 2011

(54) PASSIVE REMOVAL OF SUCTION AIR FOR LAMINAR FLOW CONTROL, AND ASSOCIATED SYSTEMS AND METHODS

(75) Inventor: Pradip G. Parikh, Renton, WA (US)

(73) Assignee: The Boeing Company, Chicago, IL (US)

( * ) Notice: Subject to any disclaimer, the term of this patent is extended or adjusted under 35 U.S.C. 154(b) by 835 days.

(21) Appl. No.: 11/763,569

(22) Filed: Jun. 15, 2007

(65) Prior Publication Data

US 2009/0212165 A1    Aug. 27, 2009

(51) Int. Cl.
B64C 21/06    (2006.01)
(52) U.S. Cl. ..................................... 244/209
(58) Field of Classification Search ............... 244/198, 244/199.4, 199.3, 207–209, 130, 204
See application file for complete search history.

(56) References Cited

U.S. PATENT DOCUMENTS

| | | | |
|---|---|---|---|
| 2,646,945 A | | 7/1953 | Perry |
| 2,650,781 A | * | 9/1953 | Taylor .......................... 244/198 |
| 2,751,168 A | * | 6/1956 | Stalker ......................... 244/209 |
| 2,833,492 A | * | 5/1958 | Fowler ......................... 244/209 |
| 2,971,331 A | | 2/1961 | Silverman et al. |
| 3,430,640 A | | 3/1969 | Lennard |
| 3,578,265 A | | 5/1971 | Patierno et al. |
| 3,664,612 A | | 5/1972 | Skidmore et al. |
| 3,941,336 A | | 3/1976 | Nangia |
| 3,951,360 A | * | 4/1976 | Anxionnaz ................... 244/209 |
| 4,000,869 A | * | 1/1977 | Wong et al. ................ 244/53 B |
| 4,025,008 A | | 5/1977 | Peikert |
| 4,114,836 A | | 9/1978 | Graham et al. |
| 4,132,240 A | | 1/1979 | Frantz |
| 4,314,341 A | | 2/1982 | Kivela |

(Continued)

FOREIGN PATENT DOCUMENTS

DE    19938317 A1    2/2001

(Continued)

OTHER PUBLICATIONS

International Search Report and Written Opinion, International Patent Application No. PCT/US2008/064725, Applicant: The Boeing Company; mailed May 23, 2008, 14 pages.

(Continued)

*Primary Examiner*—Galen Barefoot
(74) *Attorney, Agent, or Firm*—Perkins Coie LLP

(57) ABSTRACT

Passive removal of suction air for producing a laminar flow, and associated systems and methods are disclosed. One such method includes forming a laminar flow region over an external surface of an aircraft by drawing air through the external surface and into a plenum. The method can further include passively directing the air from the plenum overboard the aircraft. For example, the air can be passively directed to a region external to the aircraft having a static pressure lower than a static pressure in the plenum, as a result of the motion of the aircraft. Flows from different sections of the external surface can be combined in a common plenum, and the corresponding massflow rates can be controlled by the local porosity of the external surface.

21 Claims, 7 Drawing Sheets

U.S. PATENT DOCUMENTS

| | | | |
|---|---|---|---|
| 4,381,017 A | | 4/1983 | Bissinger |
| 4,575,030 A | | 3/1986 | Gratzer |
| 4,641,678 A | | 2/1987 | Haas et al. |
| 4,749,151 A | | 6/1988 | Ball et al. |
| 4,813,631 A | | 3/1989 | Gratzer |
| 4,865,268 A | | 9/1989 | Tracksdorf |
| 5,078,341 A | | 1/1992 | Bichler et al. |
| 5,263,667 A | * | 11/1993 | Horstman .................. 244/209 |
| 5,313,700 A | | 5/1994 | Dorman |
| 5,348,256 A | * | 9/1994 | Parikh ........................ 244/209 |
| 5,490,644 A | | 2/1996 | Koncsek et al. |
| 5,917,286 A | | 6/1999 | Scholl et al. |
| 6,027,078 A | | 2/2000 | Crouch et al. |
| 6,276,636 B1 | | 8/2001 | Krastel |
| 6,634,595 B2 | | 10/2003 | Koncsek et al. |
| 6,834,830 B2 | | 12/2004 | Fujino |
| 6,969,029 B2 | | 11/2005 | Crouch et al. |
| 7,093,792 B2 | | 8/2006 | Fujino et al. |
| 7,100,875 B2 | * | 9/2006 | Shmilovich et al. ...... 244/199.4 |
| 7,152,829 B2 | | 12/2006 | Bertolotti |
| 2004/0129839 A1 | | 7/2004 | Patel et al. |
| 2007/0241229 A1 | | 10/2007 | Silkey et al. |
| 2008/0023589 A1 | | 1/2008 | Miles et al. |
| 2008/0096045 A1 | | 4/2008 | Fairbourn et al. |
| 2008/0265100 A1 | | 10/2008 | Crouch et al. |

FOREIGN PATENT DOCUMENTS

| | | |
|---|---|---|
| EP | 0679572 A2 | 11/1995 |
| EP | 1081332 A1 | 3/2001 |
| EP | 1167187 A1 | 1/2002 |
| FR | 2783885 A1 | 3/2000 |
| GB | 2402196 | 12/2004 |

OTHER PUBLICATIONS

Crouch, J.D. et al., "Variable N-Factor Method for Transition Prediction in Three-Dimensional Boundary Layers", pp. 211-216, AIAA Journal, vol. 38, No. 2, Feb. 2000.

Crouch, J.D., "Receptivity of Three-Diminsional Boundary Layers", 10 pgs, AIAA 93-0074, 31st Aerospace Sciences Meeting & Exhibit, Jan. 1993, Reno, NV.

Radeztsky, Jr., R.H. et al., "Effect of Micron Sized Roughness on Transition in Swept-Wing Flows", 14 pgs, AIAA 93-0076, 31st Aerospace Sciences Meeting & Exhibit, Jan. 1993, Reno, NV.

Schrauf, G., "Status and perspectives of laminar flow", pp. 639-644, The Aeronautical Journal, vol. 109, No. 1102, Dec. 2005.

* cited by examiner

PASSIVE REMOVAL OF SUCTION AIR FOR LAMINAR FLOW CONTROL, AND ASSOCIATED SYSTEMS AND METHODS

TECHNICAL FIELD

The present disclosure is directed generally to techniques for passively removing suction air to create a laminar flow environment on aircraft external surfaces, and associated systems and methods.

BACKGROUND

Aircraft designers and manufacturers are under continual pressure to reduce the aerodynamic drag on aircraft surfaces, so as to increase aircraft performance and/or reduce aircraft fuel consumption. A significant amount of aircraft drag is caused by boundary layers that build up on the exposed surfaces of the aircraft during flight. A boundary layer is a thin film of low velocity, low dynamic pressure air located near a solid boundary and resulting from the air being at rest at the interface with the solid boundary. The boundary layer build-up on the aircraft wings and/or other external surfaces causes skin friction and therefore significantly contributes to airplane drag. Because laminar boundary layers create less friction at the aircraft surfaces than do turbulent boundary layers, one technique for reducing aircraft drag is to establish and preserve a laminar boundary layer over a significant portion of the aircraft external surfaces.

One effective method for establishing and preserving a laminar boundary layer is to remove a small amount of the boundary layer flow through the exposed flow surface via a distributed suction system. A representative system in accordance with the prior art is shown in FIG. 1. Such a system 40 installed on a wing 20 includes perforations 46 in an external surface 43 of the wing 20. The external surface 43 can have various regions with different porosities. Individual ducts 48 incorporating flow control valves 49 collect the flow removed from the various regions of the external surface 43 and provide the flow to a collection duct 71. A compressor 70 (e.g., a turbo-compressor or electric motor driven compressor) generates the suction force required to draw the boundary layer air through the perforations 46 and discharge the air overboard the aircraft.

In order to establish and control the desired suction distribution over the external surface 43, the suction system 40 includes multiple, sub-surface compartments with corresponding flow ducts 48 and associated individual control valves 49. While such a system has produced an extended region of laminar flow over the external surface 43, the weight, complexity and power requirements of the system detract from the potential economic benefit that it can provide.

SUMMARY

Aspects of the present disclosure are directed to passive flow removal for laminar flow, and associated systems and methods. One such method for controlling aircraft external flow includes forming a laminar flow region over an external surface of an aircraft by drawing air through the external surface into a plenum. The method can further include passively directing the air from the plenum overboard the aircraft. For example, passively directing the air from the plenum can include directing the air to a region external to the aircraft having a static pressure lower than a static pressure in the plenum, as a result of the motion of the aircraft. In further particular aspects, the air can be directed through a scoop having an aft-facing exit opening. In still further aspects, the method can also include controlling the amount of air drawn through the external surface by controlling an area of the exit opening, for example, via a movable door.

An aircraft system in accordance with another embodiment includes an aircraft external flow surface having multiple openings and being positioned to be exposed to an external airstream during flight. A plenum is positioned interior to the external flow surface and is in fluid communication with the multiple openings. A passive flow removal device is positioned in fluid communication with the plenum and can have an exit opening positioned to remove air from the plenum to the external airstream. The passive flow removal device can be configured to remove the air from the plenum without adding energy to the air between the external surface openings and the exit opening. For example, the passive flow removal device can include a flow regulator positioned along a flow path between the exit opening and the multiple openings in the external surface. The flow regulator can include a door that is moveable between a first position and a second position, with the exit opening having a first area when the door is in the first position, and a second area different than the first area when the door is in the second position. In further particular aspects, the multiple openings can be located in a first region having a first porosity and a second region having a second porosity different than the first. Flow from both regions can be directed into a common collection plenum.

DETAILED DESCRIPTION

The following description is directed generally toward systems and methods for passively providing suction for laminar flow control at aircraft external surfaces. For example, several embodiments include drawing flow through the external surface to a common plenum and directing the flow overboard the aircraft without the use of a compressor or other active device. Several details describing structures or processes that are well-known and often associated with aspects of these systems and methods are not set forth in the following description for purposes of brevity. Moreover, although the following disclosure sets forth several embodiments of different aspects of the invention, several other embodiments can have different configurations or different components than those described in this section. For example, other embodiments may have additional elements and/or may delete several of the elements described below with reference to FIGS. 1-8D.

Several embodiments of the invention described below may take the form of computer-executable instructions, including routines executed by a programmable computer (e.g., a controller). Those skilled in the relevant art will appreciate that embodiments can be practiced on computer systems other than those shown and described below. Certain embodiments can include a special-purpose computer, controller or other data processor that is specifically programmed, configured or constructed to perform one or more of the computer-executable instructions described below. Accordingly, the term "computer" as generally used herein, refers to any data processor, and can include controllers, multi-processor systems, processor-based or programmable consumer electronics, network computers, minicomputers, and the like.

Figure 1:
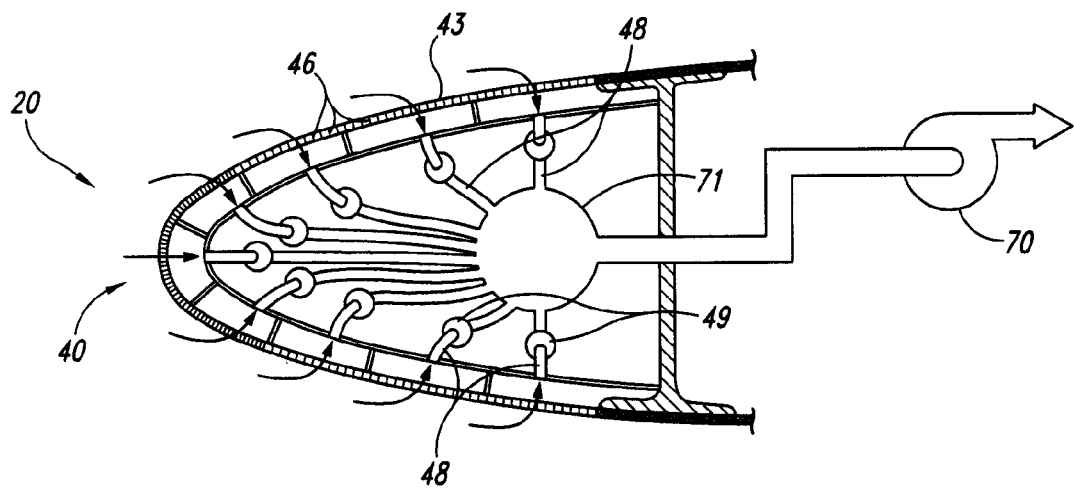
FIG. 1 is a partially schematic illustration of a suction system in accordance with the prior art.
Figure 2:
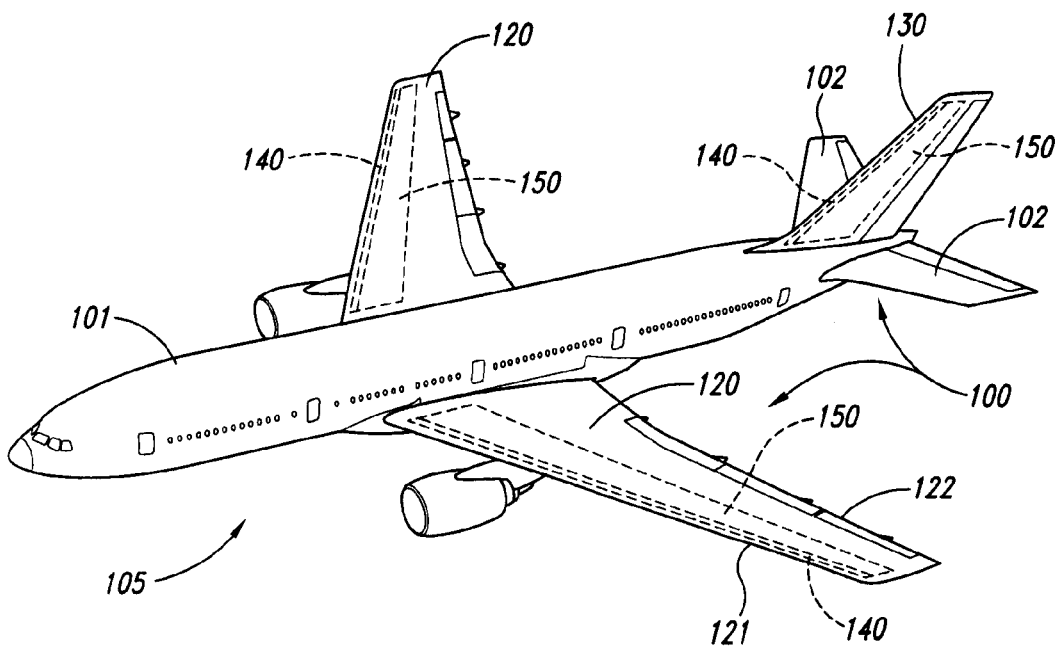
FIG. 2 is a partially schematic illustration of an aircraft having one or more suction regions configured in accordance with an embodiment of the invention.

FIG. 2 illustrates an aircraft 105 having a suction system 100 configured in accordance with a particular embodiment. The aircraft 105 can include a fuselage 101, wings 120 depending from the fuselage 101, horizontal stabilizers 102, and a vertical stabilizer 130. The wings 120 include a leading edge 121, a trailing edge 122, and a suction region 140 generally positioned at or near the leading edge 121 and extending in an aft direction. At the suction region 140, a relatively small amount of flow can be removed from the wing surface to produce a laminar flow region 150 that extends aft beyond the suction region 140.

The system 100 can include suction regions 140 disposed on other surfaces of the aircraft 105, in addition to or in lieu of the wing surfaces. For example, the vertical stabilizer 130 can include a suction region 140 that produces a corresponding aft-extending laminar flow region 150. In other embodiments, other surfaces of the aircraft 105 (e.g., the horizontal stabilizers 102 and/or the fuselage 101) can include corresponding suction regions.

Figure 3:
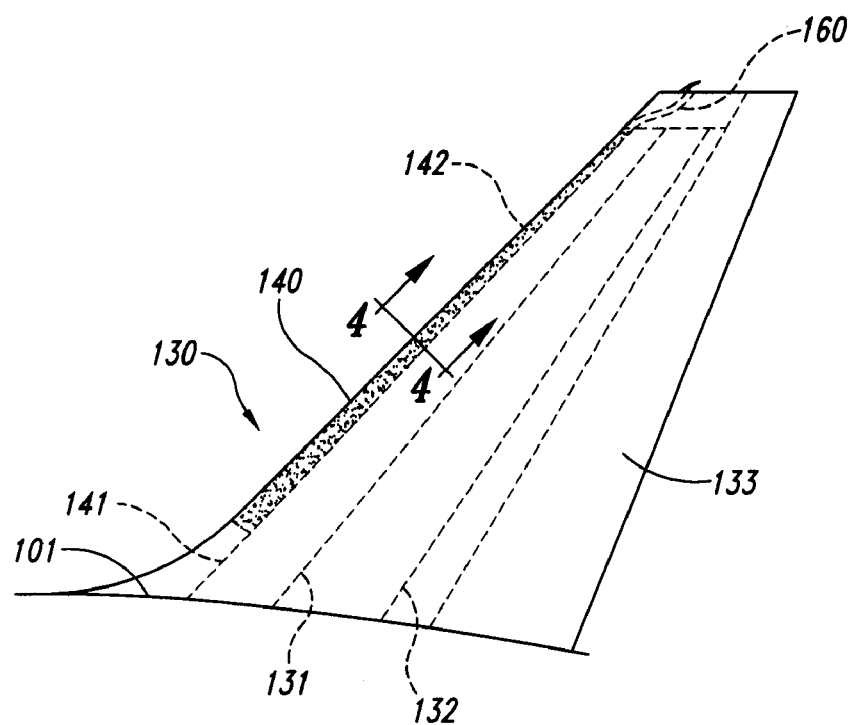
FIG. 3 is a partially schematic illustration of a suction region positioned at the vertical stabilizer of the aircraft shown in FIG. 2.

FIG. 3 is a partially schematic, side elevation illustration of the vertical stabilizer 130 (shown in FIG. 2) and the associated suction region 140. The vertical stabilizer 130 includes a structural front spar 131 and aft spar 132 that, together with the external skin of the vertical stabilizer 130, support the vertical stabilizer 130 relative to the fuselage 101. A rudder 133 is positioned aft the rear spar 132 to provide lateral control for the aircraft. The vertical stabilizer 130 can also include an auxiliary bulkhead or spar 141 positioned forward of the front spar 131. The region forward of the auxiliary spar 141 can define, at least in part, a collection plenum 142 that collects flow removed from the external surface of the vertical stabilizer 130 in the suction region 140. A flow removal device 160 then directs the flow out of the collection plenum 142 and overboard the aircraft.

Figure 4:
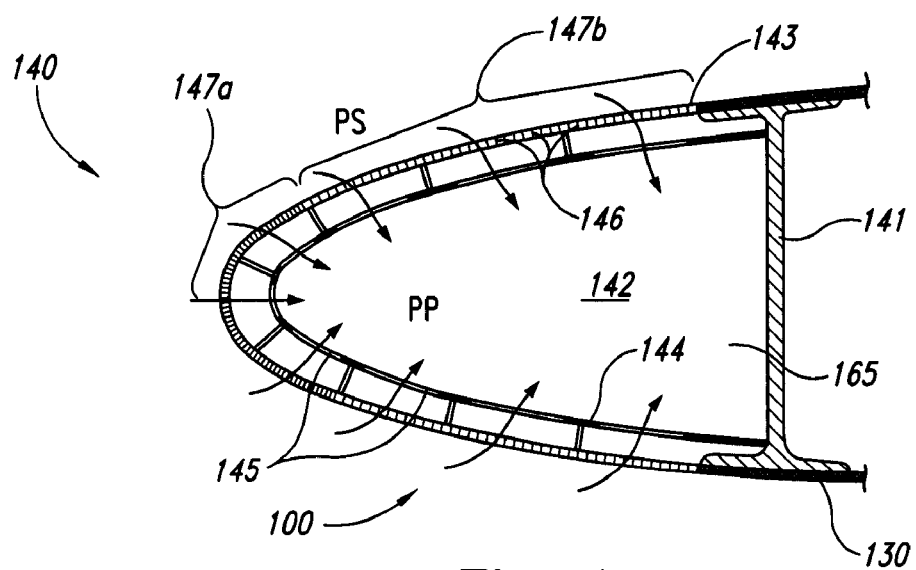
FIG. 4 is a partially schematic, cross-sectional illustration of a portion of the vertical stabilizer 130 taken substantially along lines 4-4 of FIG. 3.

FIG. 4 is an enlarged, cross-sectional illustration of the collection plenum 142 shown in FIG. 3. The collection plenum 142 is generally bounded by the auxiliary spar 141 and by an external surface 143 of the vertical stabilizer 130. The external surface 143 includes a multitude of perforations 146 or other openings through which boundary layer air passes as it is drawn into the collection plenum 142. The vertical stabilizer 130 can optionally include an inner surface 144 that is attached to and inwardly offset from the external surface 143 to provide increased strength. When the inner surface 144 is included, it can have multiple large cutouts 145 that reduce the extent to which it constricts the flow passing through the external surface 143 and into the collection plenum 142.

The external surface 143 can include multiple sections 147, illustrated schematically in FIG. 4 as a representative first section 147a and a representative second section 147b. The porosities in each these sections 147a,147b can be different, depending upon the local requirements for the amount of suction flow necessary to maintain laminar flow over the external surface 143. For example, in at least some cases, it is expected that the required amount of suction flow will be greater near the leading than aft of the leading edge. Accordingly, the first section 147a can have a higher porosity than the second section 147b so as to remove flow at a higher rate toward the leading edge of the vertical stabilizer 130 than in the region aft of the leading edge. The porosity in each of the sections 147a,147b can be controlled by controlling the size and/or spacing of individual perforations 146 (or other openings) in the external surface 143. In other embodiments, the suction region 140 can include more than two sections 147 having different porosities, as will be discussed in greater detail below with reference to FIGS. 6A-7B. In still further embodiments, the distributed perforations 146 can be replaced with other openings (e.g., slots) in the external surface 143.

In any of the foregoing embodiments, it is desirable to maintain a plenum pressure PP in an interior region 165 of the collection plenum 142 that is lower than the lowest static pressure PS adjacent to the external surface 143 over the suction region 140. By maintaining a relatively low pressure in the collection plenum 142, the system 100 can reduce or eliminate the likelihood that flow will pass outwardly (rather than inwardly) through the perforations 146. Outward flow can disrupt the boundary layer and/or cause the boundary layer to become turbulent, rather than maintain the boundary layer in a laminar state. Techniques for maintaining the relatively low plenum pressure PP in the collection plenum 142 are described further below with reference to FIG. 5.

Figure 5A:
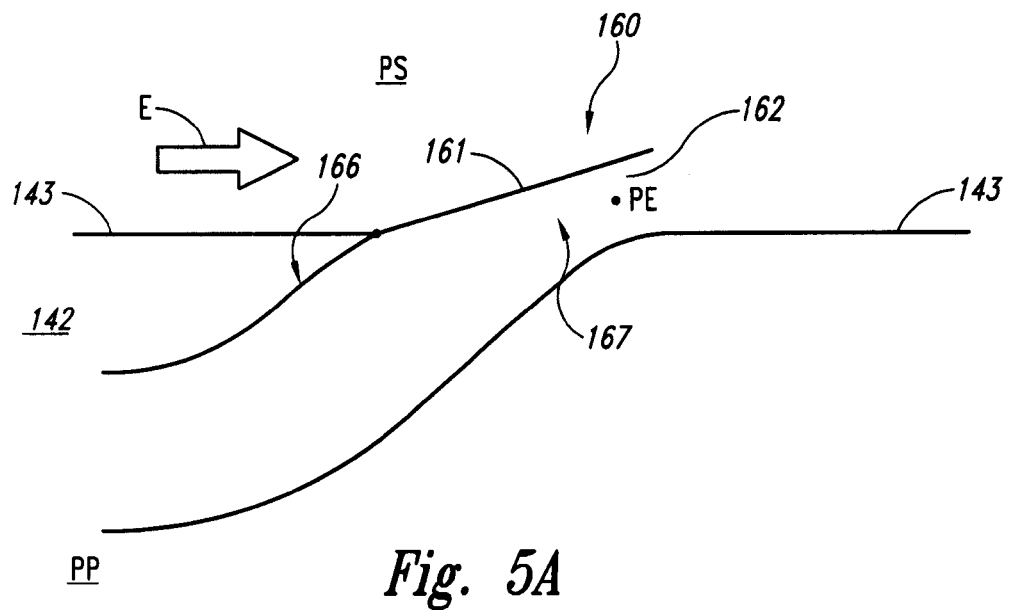
FIG. 5A is a schematic side view of a passive flow removal device configured in accordance with another embodiment of the invention.

FIG. 5A is a schematic cross-sectional illustration of the passive flow removal device 160 introduced above with reference to FIG. 3. The flow removal device 160 can include a scoop 166 having a backward facing exit opening 162. An external pressure PE in an exterior region proximate to the scoop 166 can accordingly be maintained below the static pressure PS of the external stream E and below the plenum pressure PP at the interior region 165 of the collection plenum 142. In certain embodiments, the scoop 166 can include a door 161 that defines, at least in part, the exit opening 162. The door 161 can have a fixed position and can accordingly define a fixed exit opening 162. Accordingly, the door 161 can operate as a flow regulator 167, with the amount of flow exiting the collection plenum 142 controlled by the difference between the external pressure PE and the plenum pressure PP. The external pressure PE is in turn controlled by the aircraft altitude and velocity.

Figure 5B:
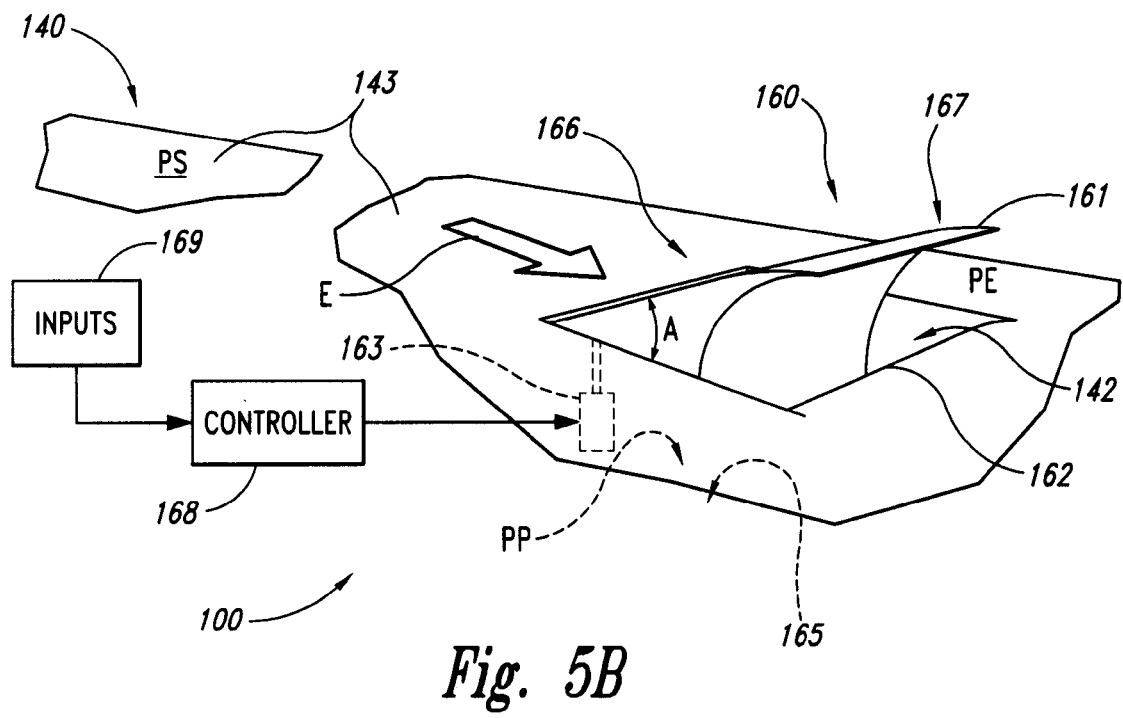
FIG. 5B is a partially schematic isometric illustration of the device shown in FIG. 5A.

FIG. 5B is an isometric illustration of an embodiment of the flow removal device 160 shown in FIG. 5A. In this embodiment, the door 161 can be moveable to provide an additional degree of freedom by which to control the amount of suction flow removed from the corresponding aircraft surface. For example, the system 100 can include an actuator 163 coupled to the door 161 to control a door opening angle A. At a given flight condition, a smaller door angle A generally produces a reduced amount of flow through the exit opening 162 and therefore a reduced amount of suction flow at the corresponding aircraft surface. Smaller door angles A also produce less external drag.

The motion of the door 161 can be directed by a controller 168, for example, a controller programmed with computer readable instructions. The controller 168 can receive inputs 169 and direct the motion of the door 161 based at least in part on those inputs 169. The inputs 169 can include freestream conditions, target suction flow removal rates, associated door positions, and an equation, table or other function that provides a map or other correlation for setting the door position based on the freestream (or other) conditions.

The existence of an actuated door 161 (in at least some embodiments) does not detract from the passive nature of the manner in which flow is removed from the corresponding aircraft surface and directed overboard the aircraft. In particular, while the door 161 may be activated to change the size of the exit opening 162 and in at least some cases, the external pressure PE adjacent to the exit opening 162, the door 161 does not add energy directly to the removed flow, as does a conventional active device, such as a compressor or a flow driven ejector device. Put another way, once the door 161 is moved to an appropriate position, no additional energy need be added to the system to direct air through the exit opening 162. An advantage of this feature, which can be common to both actuated and non-actuated doors 161, is that it can reduce aircraft drag (by producing laminar flow) without significantly increasing aircraft power consumption. In at least some cases, overall aircraft efficiency can be further enhanced because the flow regulator (e.g., the door 161 and optional actuator) may be lighter weight than a turbocompressor and associated exhaust ducting or other active device that is conventionally used to pump suction air overboard the aircraft.

Figure 6A:
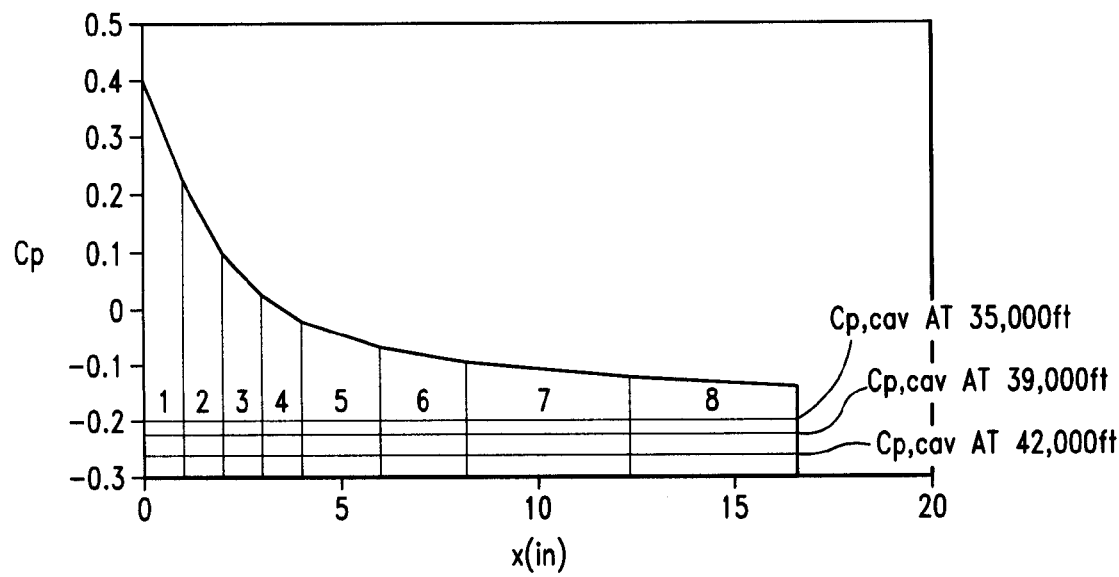
FIGS. 6A and 6B illustrate expected chord-wise pressure and suction distributions in accordance with an embodiment of the invention.

FIGS. 6A-7B illustrate system and flow characteristics associated with a representative external laminar flow surface (e.g., the vertical tail external surface 143 shown in FIG. 4). In this particular embodiment, the external surface is divided into eight sections that are labeled numerically in FIGS. 6A and 6B. FIG. 6A illustrates a corresponding non-dimensional pressure coefficient $C_p$ at the external surface in each of the eight sections, as a function of distance from the leading edge. FIG. 6A also illustrates the expected non-dimensional pressure coefficient $C_{p,cav}$ (based on the plenum pressure PP) within the collection plenum, at three representative aircraft altitudes (35,000 feet, 39,000 feet and 43,000 feet). As is evident from FIG. 6A, at each of the foregoing altitudes, the pressure coefficient $C_{p,cav}$ within the plenum is less than the pressure coefficient $C_p$ at the external surface, over all eight sections. Accordingly, at each of the foregoing three altitudes, flow will be withdrawn from the external surface into the collection plenum.

Figure 6B:
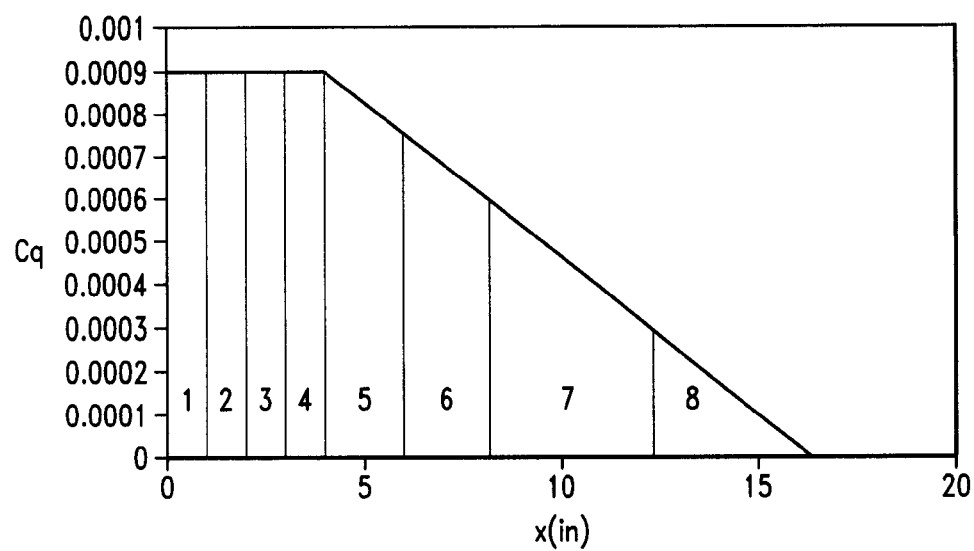

FIG. 6B illustrates the expected non-dimensional suction parameter $C_q$ (corresponding to the surface mass flux divided by the freestream mass flux) at each of the eight sections, expected to maintain laminar flow over a desired region of the surface. Mass flux refers generally to mass flow rate per unit area. As is shown in FIG. 6B, the highest mass flow requirements are near the leading edge of the surface, and the mass flow requirements decrease aft of the leading edge. This requirement is compatible with the pressure distribution shown in FIG. 6A, which illustrates the greatest pressure difference between the external surface and the plenum near the leading edge, and a lower pressure difference aft of the leading edge. As is also shown in FIG. 6B, the local mass flux ratio for each station is expected to be less than 0.1%, meaning that less than one-tenth of one percent of the freestream mass flow rate per unit area is expected to produce extensive laminar flow. In other embodiments, the suction parameter $C_q$ can have other values, generally less than 1.0%.

Figure 7A:
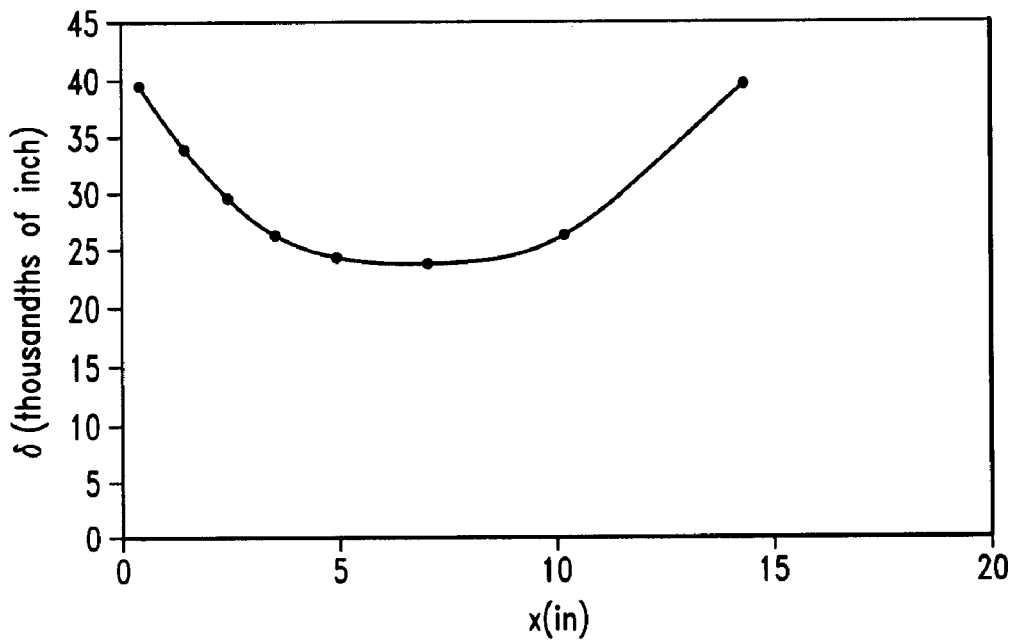
FIGS. 7A and 7B illustrate expected hole spacing and suction coefficient distributions in accordance with an embodiment of the invention.

FIG. 7A illustrates a representative technique for achieving a porosity at the external surface sufficient to produce the mass flow characteristics shown in FIG. 6B, assuming the pressure difference characteristics shown in FIG. 6A. In this particular embodiment, the holes in the external surface are assumed to be 0.0025 inches in diameter, and the porosity is controlled by controlling the spacing between neighboring holes (indicated on the vertical axis in thousandths of an inch). FIG. 7A illustrates a representative calculation for 39,000 feet, assuming a plenum pressure coefficient $C_{p,cav}$ of −0.22 (see FIG. 6A). FIG. 7A indicates that, at the selected conditions, the hole spacing associated with the local target mass flow initially decreases in an aft direction and then increases. This reflects the fact that for this particular geometry, the difference between the surface pressure coefficient $C_p$ and the cavity pressure coefficient $C_{p,cav}$ changes at a different rate than does the mass flow expected to maintain laminar flow.

Figure 7B:
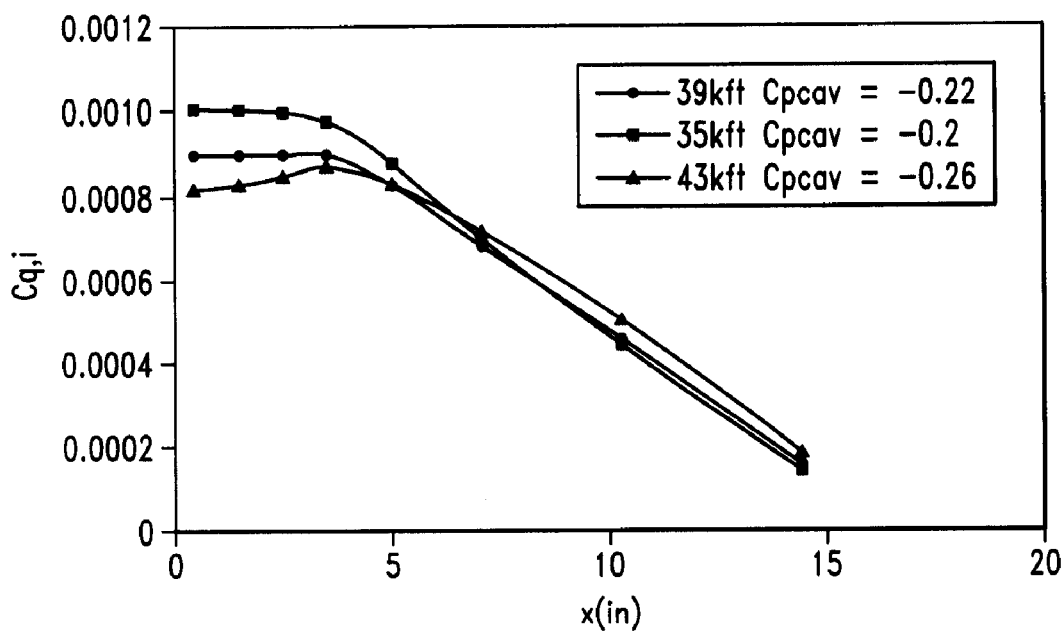

The calculation was repeated at representative altitudes of 35,000 and 43,000 feet assuming the porosity distribution determined for 39,000 feet, and the results are illustrated in FIG. 7B. Accordingly, FIG. 7B illustrates the nondimensional mass flow distribution for each of the foregoing altitudes as a function of distance from the surface leading edge.

Figure 8A:
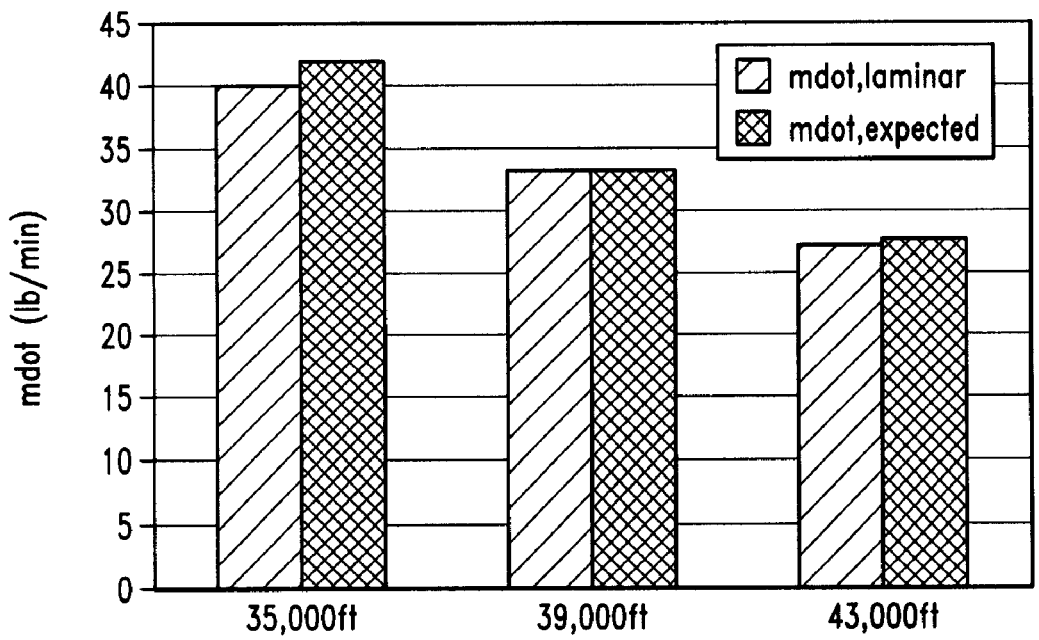
FIGS. 8A-8D illustrate further suction system characteristics in accordance with further embodiments of the invention.

FIG. 8A illustrates estimated mass flows associated with producing laminar flow over a target region, along with estimated mass flows expected to be withdrawn through the flow surface, for each of the three foregoing altitudes. This graph indicates that at 39,000 feet, the estimated suction mass flow approximately matches that required to produce laminar flow over the target region, and that at 35,000 feet and 43,000 feet, the estimated mass flow slightly exceeds the required mass flow by an acceptable amount.

Figure 8B:
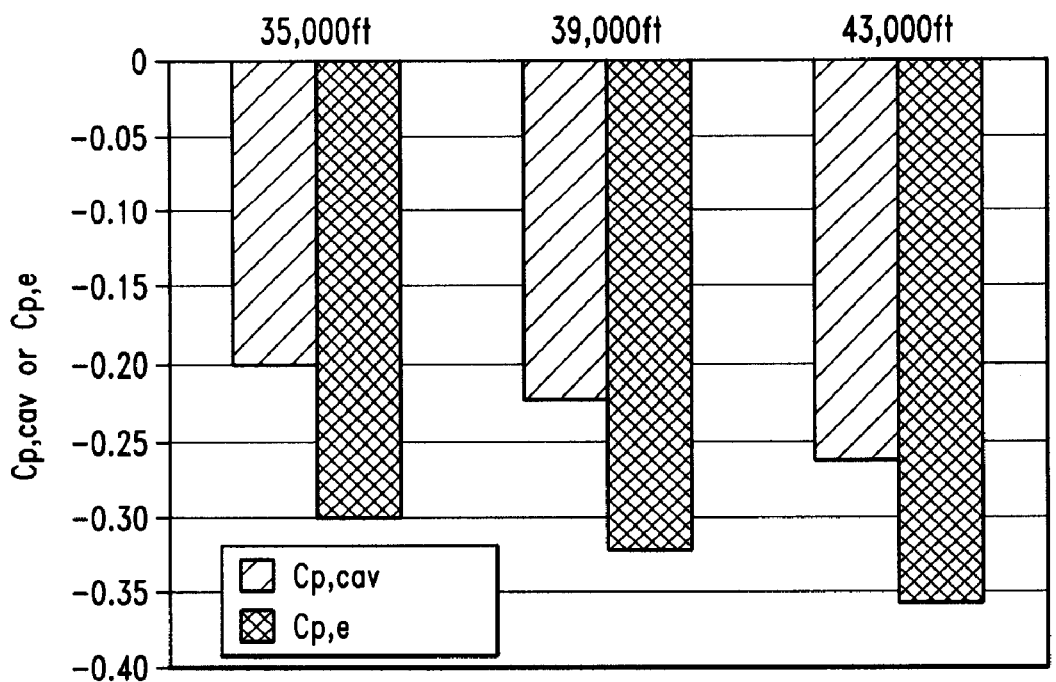

FIG. 8B illustrates estimated pressure coefficients for the plenum ($C_{p,cav}$) and plenum exit ($C_{p,e}$, based on PE), indicating estimated pressure losses within the collection plenum at each of the three foregoing altitudes. In the particular scenario illustrated in FIG. 8B, it is estimated that the internal pressure loss equivalent is about 0.1 $C_p$. The pressure loss within the plenum can be controlled by controlling the effective flow area through the plenum and the resulting speed of the flow through the plenum. For example, in a particular embodiment, the plenum is generally open, and includes few obstructions, and the resulting velocity through the plenum is expected to be about Mach 0.3 or less (e.g., about Mach 0.1).

Figure 8C:
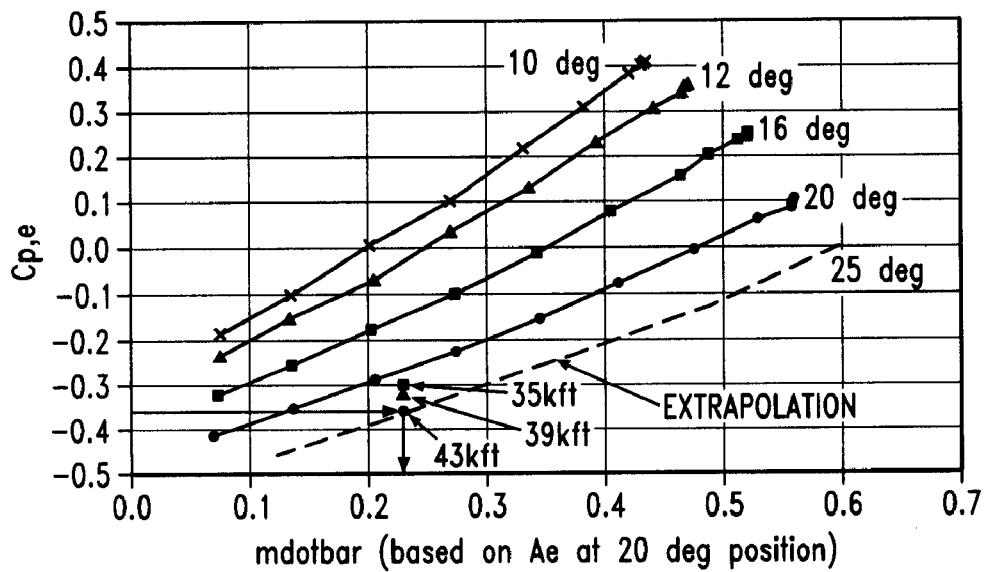

FIG. 8C is a graph illustrating a representative nondimensional mass flow parameter, "mdotbar," along the x-axis, and a corresponding pressure coefficient in the exit duct, just upstream of the scoop 166 (shown in FIG. 5) along the y-axis. The mass flow parameter mdotbar was measured experimentally and is based on the exit area for the door shown in FIG. 5 being at a 20 degree position. Each line shown on the graph in FIG. 8C corresponds to a different door angle, with 10 degrees being a small door opening and 25 degrees being a larger door opening. Superimposed on FIG. 8C are the three estimated suction pressure coefficients, $C_{p,e}$, associated with each of the three altitudes, 35,000 feet, 39,000 feet, and 43,000 feet. These predicted requirements indicate that at 43,000 feet, the door should be opened to its 25 degree position to draw the target mass flow through the exit opening. At lower altitudes, the door angle can be reduced. Accordingly, it may be beneficial to activate the door so as to open it by only the amount required to draw the required mass flow from the collection plenum. In this manner, the door need not be opened any more then necessary to produce the target mass flow, and the external drag produced by the door can be controlled. The door can be shut off completely on the ground and during low altitude flight.

Figure 8D:
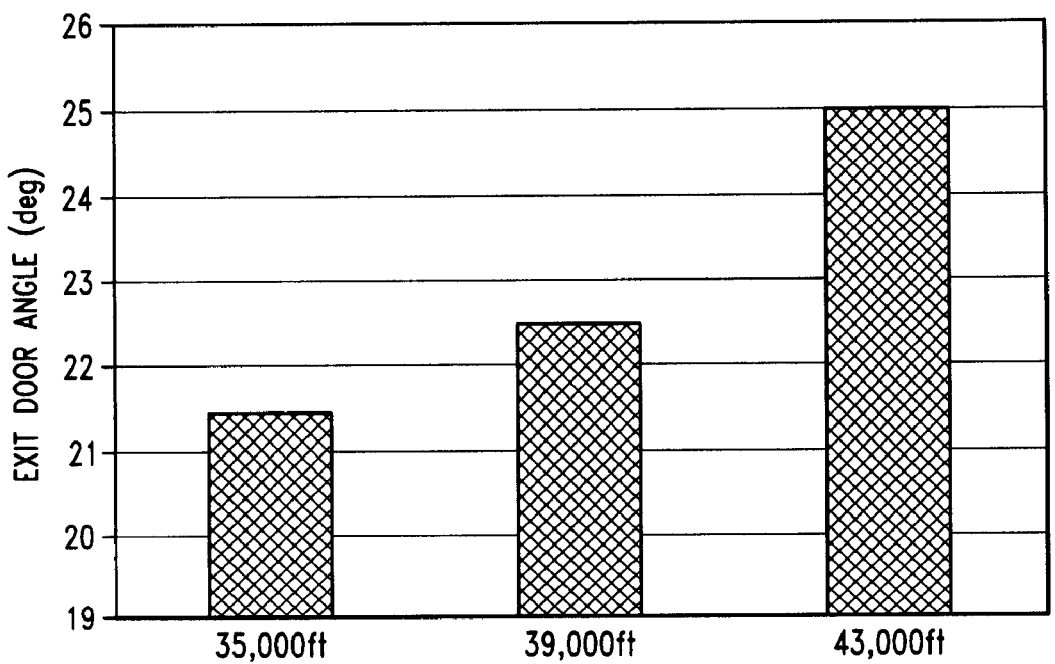

FIG. 8D illustrates a representative schedule for the exit door angle as a function of cruise altitude, based on the information shown in FIG. 8C. The drag penalty associated with the use of an aft-facing scoop to evacuate suction air passively from the collection plenum is expected to be relatively small. For example, in a particular embodiment, it is expected that 10%-15% of the drag reduction resulting from the passive laminar flow is lost due to drag associated with the scoop. Drag values in this range are expected to be less than the penalty associated with a powered suction system (e.g., a turbo-compressor). In addition, embodiments of the passive system are expected to be less complex and lower weight, and are therefore expected to reduce installation, operation, and maintenance costs.

From the foregoing, it will be appreciated that specific embodiments have been described herein for purposes of illustration, but that various modifications may be made without deviating from the invention. For example, the flow removal devices shown in the Figures can have other arrangements in other embodiments. The representative pressure coefficients, mass flow coefficients and door exit angles may have other values in other embodiments. Aspects of the systems shown in the Figures may be applied to aircraft having configurations other than those shown in FIG. 2 (e.g., rotorcraft, military aircraft, blended wing-body aircraft, and others). Flow regulators configured and positioned to control the amount of flow removed through the external flow surface can include structures other than a door (e.g., a variable-position valve). Certain aspects described in the context of particular embodiments may be combined or eliminated in other embodiments. For example, the arrangement shown generally in FIG. 4 as applied to an aircraft vertical stabilizer may be applied in a generally similar manner to an aircraft wing or other aircraft surface. Further, while advantages associated with certain embodiments have been described in the context of those embodiments, other embodiments may also exhibit such advantages, and not all embodiments need necessarily exhibit such advantages to fall within the scope of the invention. Accordingly, the invention is not limited except as by the appended claims.

I claim:

1. A method for controlling aircraft external flow, comprising:
   forming a laminar flow region over an external surface of an aircraft by drawing air through the external surface into a plenum, wherein drawing air through the external surface into the plenum includes:
      drawing a first portion of the air through a first section of the external surface having a first porosity;
      drawing a second portion of the air through a second section of the external surface having a second porosity different than the first porosity; and
      collecting the first and second portions of air in a common plenum; and
   passively directing the air from the plenum overboard the aircraft, wherein passively directing the air from the plenum includes:
      directing the air from the plenum through an exit opening via a pressure difference between a region interior to the plenum and a region exterior to the exit opening, the pressure difference resulting from motion of the aircraft; and
      controlling the amount of air drawn through the external surface by controlling an area of the exit opening.

2. The method of claim 1 wherein drawing air through the external surface includes drawing air through the external surface at a region where the pressure at the external surface is less than a static pressure of the freestream air though which the aircraft is flying.

3. The method of claim 1 wherein passively directing the air from the plenum includes directing the air without passing the air through a compressor.

4. The method of claim 1 wherein passively directing the air from the plenum includes directing the air through a scoop having the exit opening, and wherein the exit opening is aft facing.

5. The method of claim 4 wherein directing the air through a scoop includes directing the air through a scoop having a fixed exit opening.

6. The method of claim 4 wherein the scoop includes a door adjacent the exit opening, and wherein controlling an area of the exit opening includes controlling an amount by which the door is opened.

7. The method of claim 6 wherein controlling an area of the exit opening is performed by computer-based instructions.

8. The method of claim 1 wherein the external surface includes an airfoil surface having a leading edge, and wherein drawing the first portion of the air includes drawing the first portion of the air at a first rate at a first location relative to the leading edge, and drawing the second portion of the air includes drawing the second portion of the air at a second rate less than the first rate at a second location aft of the first location.

9. The method of claim 1 wherein drawing air includes drawing air at a rate of about 1% or less of the air passing over the surface.

10. The method of claim 1 wherein drawing air includes drawing air at a rate of about 0.1% or less of the air passing over the surface.

11. The method of claim 1, further comprising controlling a rate at which air is drawn through the external surface as a function of a static pressure external to the aircraft.

12. The method of claim 1, further comprising controlling a rate at which air is drawn through the external surface via a static pressure external to the aircraft.

13. A method for controlling aircraft external flow, comprising:
   forming a laminar flow region over an external surface of an aircraft airfoil by:
   passing a flow of air over the external surface;
   drawing a first portion of the air through a first section of the external surface having a first porosity;
   drawing a second portion of the air through a second section of the external surface having a second porosity different than the first porosity;
   collecting the first and second portions of air in a common plenum;
   passively directing the air from the plenum overboard the aircraft via an exit opening, without adding energy to the air between the external surface and the exit opening; and
   controlling the amount of air drawn through the external surface by controlling an area of the exit opening.

14. The method of claim 13 wherein passively directing the air from the plenum includes directing the air without pressurizing the air with a compressor.

15. The method of claim 13 wherein controlling the amount of air drawn through the external surface includes automatically controlling the area of the exit opening as a function of static pressure external to the aircraft.

16. The system of claim 13 wherein passively directing the air includes directing the air through a scoop having the exit opening, and wherein the exit opening faces aft.

17. An aircraft system, comprising:
an aircraft external flow surface positioned to be exposed to an external airstream during flight, the external flow surface having multiple openings, the multiple openings forming a first region having a first porosity and a second region having a second porosity different than the first;
a common plenum positioned interior to the external flow surface and in fluid communication with the multiple openings in both the first and second regions; and
a passive flow removal device in fluid communication with the plenum, the passive flow removal device having an exit opening positioned to remove air from the plenum to the external airstream, the passive flow removal device being configured to remove the air from the plenum without adding energy to the air between the openings in the external flow surface and the exit opening, the passive flow removal device including a flow regulator positioned along a flowpath between the exit opening and the multiple openings in the external surface.

18. The system of claim 17 wherein the passive flow removal device includes a scoop having an aft-facing region at which the exit opening is positioned.

19. The system of claim 17, further comprising a controller operatively coupled to the flow regulator, the controller having instructions for directing a change in a setting of the regulator as a function of ambient pressure.

20. The system of claim 17 wherein the flow regulator includes a door positioned at least proximate to the exit opening, the door being movable between a first position and a second position, the exit opening having a first area when the door is in the first position and a second area different than the first area when the door is in the second position.

21. The system of claim 17 wherein the openings in at least one of the first and second regions have a diameter of about 0.0025 inches.

* * * * *